US008819221B2

(12) United States Patent
Croot et al.

(10) Patent No.: US 8,819,221 B2
(45) Date of Patent: Aug. 26, 2014

(54) DYNAMIC LINE MANAGEMENT

(75) Inventors: Christopher Marcus Croot, Suffolk (GB); Trevor Philip Linney, Suffolk (GB); Ashley Pickering, Suffolk (GB); Philip Antony Everett, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 213 days.

(21) Appl. No.: 13/121,905

(22) PCT Filed: Sep. 30, 2009

(86) PCT No.: PCT/GB2009/002329
§ 371 (c)(1),
(2), (4) Date: Mar. 30, 2011

(87) PCT Pub. No.: WO2010/038018
PCT Pub. Date: Apr. 8, 2010

(65) Prior Publication Data
US 2011/0191472 A1 Aug. 4, 2011

(30) Foreign Application Priority Data
Sep. 30, 2008 (EP) .................................... 08253177

(51) Int. Cl.
H04L 29/06 (2006.01)

(52) U.S. Cl.
USPC ........................... 709/224; 370/230; 370/232

(58) Field of Classification Search
USPC .................................. 709/224; 370/230, 232
See application file for complete search history.

(56) References Cited

U.S. PATENT DOCUMENTS 5,134,685 A 7/1992 Rosenbluth
5,889,470 A 3/1999 Kaycee et al.
(Continued)

FOREIGN PATENT DOCUMENTS

EP 1079658 2/2001
EP 1748671 1/2007
(Continued)

OTHER PUBLICATIONS

Bostoen Et. Al. "Optimizing DSL for Multimedia Services", Alcatel telecommunications review, 2nd Quarter 2005.*
(Continued)

Primary Examiner — Hassan Kizou
Assistant Examiner — Abdullahi Ahmed
(74) Attorney, Agent, or Firm — Patterson Thuente Pedersen, P.A.

(57) ABSTRACT

A management device for use in an access network including a plurality of data connections between end user devices and an aggregation transceiver device where the connections are aggregated for onward connection through the access network, the access network storing in association with each data connection a Dynamic Line Management, DLM, profile which specifies a set of values for a plurality of parameters associated with the respective data connection, together with a stability level specifying a desired level of stability for the data connection. The device includes means for receiving monitoring data specifying the stability of each respective data connection over a predetermined period of time; means for selecting a DLM profile to be applied to the connection in dependence on both the monitoring data and the stored stability level associated with the data connection; and means for requesting an OSS system of the access network to apply the selected profile to the data connection. The DLM profile selection means disregards any resynchronizations or errors estimated to have occurred as a result of an area wide event such as a thunderstorm. It performs this estimation by detecting a large number of retrains and or errors occurring within a predetermined short test period.

12 Claims, 3 Drawing Sheets

(56) References Cited

U.S. PATENT DOCUMENTS

| | | | |
|---|---|---|---|
| 6,374,288 | B1 | 4/2002 | Bhagavath et al. |
| 6,473,851 | B1 | 10/2002 | Plutowski |
| 6,546,089 | B1 | 4/2003 | Chea et al. |
| 6,580,727 | B1 | 6/2003 | Yim et al. |
| 6,782,884 | B1 | 8/2004 | Chen et al. |
| 6,879,639 | B1 | 4/2005 | Verbin et al. |
| 6,963,538 | B1 | 11/2005 | Giroux et al. |
| 6,975,597 | B1 | 12/2005 | Baker et al. |
| 7,013,244 | B2 | 3/2006 | Cherkassky |
| 7,047,304 | B2 | 5/2006 | Senapati et al. |
| 7,058,122 | B2 | 6/2006 | Brown et al. |
| 7,076,556 | B1 | 7/2006 | Brock et al. |
| 7,130,870 | B1 | 10/2006 | Pecina et al. |
| 7,489,693 | B2 | 2/2009 | Xu |
| 7,660,601 | B2 * | 2/2010 | Janik et al. ............... 455/556.1 |
| 7,684,325 | B2 * | 3/2010 | Defoort et al. ............. 370/230 |
| 7,752,151 | B2 | 7/2010 | Nugent |
| 7,860,029 | B2 | 12/2010 | Sekine et al. |
| 7,930,399 | B2 | 4/2011 | Brown et al. |
| 7,979,370 | B1 | 7/2011 | Ershov |
| 7,986,686 | B2 | 7/2011 | Nadeau et al. |
| 8,005,018 | B2 | 8/2011 | Magnone et al. |
| 8,027,270 | B1 | 9/2011 | Campana et al. |
| 8,031,619 | B2 | 10/2011 | Gross et al. |
| 8,068,584 | B2 * | 11/2011 | Wu et al. .................... 379/1.04 |
| 8,116,218 | B2 | 2/2012 | Lv et al. |
| 8,144,580 | B2 | 3/2012 | Pickering et al. |
| 8,300,528 | B2 * | 10/2012 | Everett et al. ............. 370/232 |
| 8,406,135 | B2 | 3/2013 | Pickering et al. |
| 8,537,701 | B2 | 9/2013 | Croot et al. |
| 2002/0085626 | A1 | 7/2002 | Starr |
| 2002/0136203 | A1 | 9/2002 | Liva et al. |
| 2002/0141443 | A1 | 10/2002 | Christensen et al. |
| 2003/0182666 | A1 | 9/2003 | You |
| 2003/0236760 | A1 | 12/2003 | Nugent |
| 2004/0120390 | A1 | 6/2004 | Brown et al. |
| 2004/0146072 | A1 | 7/2004 | Farmwald |
| 2005/0021716 | A1 | 1/2005 | Adamczyk et al. |
| 2005/0021739 | A1 | 1/2005 | Carter et al. |
| 2005/0047535 | A1 | 3/2005 | Ahmed et al. |
| 2005/0123028 | A1 | 6/2005 | Cioffi et al. |
| 2005/0174938 | A1 | 8/2005 | Richardson et al. |
| 2005/0237940 | A1 * | 10/2005 | Tennyson .................... 370/235 |
| 2006/0072722 | A1 | 4/2006 | Savoor et al. |
| 2006/0114818 | A1 * | 6/2006 | Canali et al. ............... 370/216 |
| 2006/0121854 | A1 | 6/2006 | Abhishek et al. |
| 2006/0198430 | A1 | 9/2006 | Rhee et al. |
| 2006/0224532 | A1 | 10/2006 | Duan et al. |
| 2008/0095188 | A1 | 4/2008 | Remy et al. |
| 2008/0292021 | A1 | 11/2008 | Lv et al. |
| 2009/0103559 | A1 | 4/2009 | Pickering et al. |
| 2009/0262647 | A1 | 10/2009 | Pickering et al. |
| 2010/0195666 | A1 | 8/2010 | Adamczyk et al. |
| 2010/0290362 | A1 | 11/2010 | Croot et al. |
| 2010/0293274 | A1 | 11/2010 | Everett et al. |
| 2011/0274009 | A1 | 11/2011 | Cooper |
| 2011/0274101 | A1 | 11/2011 | Cooper |
| 2012/0026873 | A1 * | 2/2012 | Spinar et al. ............... 370/230 |
| 2012/0099424 | A1 | 4/2012 | Croot et al. |

FOREIGN PATENT DOCUMENTS

| | | |
|---|---|---|
| EP | 1953959 | 8/2008 |
| EP | 1995942 | 11/2008 |
| EP | 2073446 | 6/2009 |
| EP | 2209324 | 7/2010 |
| EP | 2209325 | 7/2010 |
| WO | WO0212497 | 2/2002 |
| WO | WO0235793 | 5/2002 |
| WO | WO03/009541 | 1/2003 |
| WO | WO2004/091144 | 10/2004 |
| WO | WO2005057315 | 6/2005 |
| WO | WO2006103557 | 10/2006 |
| WO | WO2007/012867 | 2/2007 |
| WO | WO2007/012869 | 2/2007 |

OTHER PUBLICATIONS

International Search Report for International Application No. PCT/GB2010/000504 dated May 11, 2010.
International Search Report for International Application No. PCT/GB2009/002329 dated Dec. 23, 2009.
International Search Report for International Application No. PCT/GB2010/000016 dated May 6, 2010.
International Search Report for International Application No. PCT/GB2010/000013 dated May 6, 2010.
Kee Bong Song et al., "Dynamic Spectrum Management for Next-Generation DSL Systems", IEEE Communication Magazine, IEEE Serice Center. vol. 40 No. 10, Oct. 1, 2002. p. 102.
Vanbleu, Advanced Equalization Techniques for DMT-Based Systems. Oct. 2004.
Anonymous: ADSL2 and ADSL2+—The New ADSL Standards. White Paper. Oct. 2006.
Anonymous: Asymmetric Digital Subscriber Line (ADSL) transceivers—Extended bandwith ADSL2 May 2003.
"Dynamic Line Management for Digital Subscriber Lines" Alcatel Technology White Paper. Jul. 12, 2007.
TR-130 xDSL EMS to NMS Interface Functional Requirements. Feb. 2007.
Application and File History for U.S. Appl. No. 13/144,902, filed Jul. 15, 2011, inventor Cooper.
Application and File History for U.S. Appl. No. 13/144,904, filed Jul. 15, 2011, inventor Cooper.
Application and File History for U.S. Appl. No. 13/260,114, filed Dec. 22, 2011 inventors Croot et al.
Written Opinion and International Search Report for International Application No. PCT/GB/2006/002818 dated Sep. 25, 2006.
Extended European Search Report for European Application No. EP06251521.8 dated Sep. 6, 2006.
International Search Report and Written Opinion for International Application No. PCT/GB2006/002826 mailed Sep. 26, 2006.
European Search Report for European Application No. EP05254769 dated Jan. 23, 2006.
Anschutz, "DSL-Evolution-Architecture Requirements for the Support of QoS-Enabled IP Service", Technical Report DSL Forum TR-059, Sep. 1, 2003. 48 pages.
Application and File History for U.S. Appl. No. 11/989,136, filed Jan. 22, 2008, inventors Pickering et al.
Application and File History for U.S. Appl. No. 11/989,408, filed Jan. 25, 2008, inventors Pickering et al.
International Search Report for International Application No. PCT/GB2008/004213 mailed May 13, 2009.
European Search Report for European Application No. EP07255001.5 dated Jul. 1, 2008.
Silverman et al., "G. gen" G. vsdl: G. ploam, "New Reporting and Control to Improve the Carriers Ability to Optimie VDSL2"—ITU Telecommunication Standardization Section. Temporary Document SD-075, ASSIA Inc. San Diego. CA Jan. 15-19, 2007. (8 pages).
Verlinden et al., "Dynamic Spectrum Management for Digital Subscriber Lines", Edition 2, White Paper. Alcatel 2005. (12 pages).
Bostoen et al., "Optimizing DSL for multimedia services", Alcatel Telecommunications Review. Jun. 2005. pp. 155-159.
Application and File History for U.S. Appl. No. 12/809,798, filed Jun. 21, 2010, inventors Croot et al.
European Office Action for European Application No. 10711070.2 dated Feb. 28, 2013.
European Result of consultation for European Application No. 10711070.2 dated Jul. 25, 2013.
Comments on International Search Report and Written Opinion of the International Searching Authority for European Application No. 10711070.2 dated Sep. 7, 2011.
Chinese First Notification of Office Action and Search Report for Chinese Application No. 201080014466.7 dated Nov. 4, 2013.
European Search Report and Opinion for European Application No. 08253177.3 dated Mar. 23, 2009.
Reply to Written Opinion in European Patent App. No. 09785179.4 dated Apr. 18, 2011.

* cited by examiner

DYNAMIC LINE MANAGEMENT

PRIORITY CLAIM

The present application is a National Phase entry of PCT Application No. PCT/GB2009/002329, filed Sep. 30, 2009, which claims priority from European Patent Application No. 08253177.3, filed Sep. 30, 2008, the disclosures of which are hereby incorporated by reference herein in their entirety.

FIELD OF THE INVENTION

The present invention relates to Dynamic Line Management.

BACKGROUND TO THE INVENTION

Dynamic Line Management (DLM) is a technique for improving the stability of DSL connections. It is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs to be re-established. This is referred to as a re-synch or a re-train and the user notices a temporary loss of service while the connection is re-established. Re-synchs are generally found to be particularly annoying by end users.

DLM seeks to minimize such re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different profiles having various different sets of values for the parameters most likely to have an impact on the stability or otherwise of a DSL connection and moving a particular connection between different profiles until a profile is found which has an acceptable stability. The profiles are applied at the local exchange (sometimes referred to—especially in the USA—as the central office) usually within a piece of equipment known as a Digital Subscriber Line Access Multiplexer (DSLAM) which houses a number of DSL transceiver units as is well known in the art.

Typically, the profiles are conceptually able to be thought of as ranging between more aggressive and less aggressive, where the more aggressive profiles tend to provide better services to the user (especially in terms of higher bit rates and lower latencies) but are more likely to result in the line being unstable, whereas less aggressive profiles tend to offer lower bit rates and/or latencies but greater stabilities.

All of the DLM solutions known to the present applicant use, as at least one of the metrics used in monitoring the performance of a line, the number of re-trains or re-synchs occurring on a line within a predetermined period of time. However, the present inventors have realized that this metric can in certain circumstances be misleading and it should therefore be processed to provide a more reliable metric of line performance.

SUMMARY OF THE INVENTION

In an embodiment, there is provided a method of operating an access network including a plurality of data connections between end user devices and an aggregation transceiver device where the connections are aggregated for onward connection through the access network, the method comprising: storing a plurality of different profiles, each of which specifies a set of values for a set of one or more parameters associated with each data connection, and, for each data connection, monitoring the performance of the connection; selecting one of said stored profiles to be applied to the connection in dependence on the results of monitoring the connection; and applying the selected profile to the data connection, wherein monitoring the connection includes determining the number of times that a mal-performance event occurs, within a given period of time, and estimating the number of those mal-performance events occurring as a result of an area-wide event affecting a plurality of lines and disregarding any such mal-performance events when selecting a profile to apply to the data connection.

In one embodiment, the monitored mal-performance events include at least resynchronizations or errors (for example whether corrected or not) but in one embodiment will include both resynchronizations and errors. Thus determining the number of mal-performance events occurring within a given period of time (typically of the order of one day or one week) could comprise counting all resynchronizations occurring on the connection during that period, counting all errors during that period or counting all errors and resynchronizations (separately or together). One easy (albeit less accurate) method of recording the "counting" (instead of accurately counting and recording the total number per connection per given period of monitoring) is to divide the monitoring period (i.e. the given period of time which is typically of the order of one day) into bins of much smaller periods (e.g. of 15 minutes) and simply to record if there are any resynchronizations in this bin (e.g. with a binary 1) or not (which can be recorded with a binary 0); a similar record can be kept for errors (or, since errors are much more common and less serious than resynchronizations generally a binary 1 could only be recorded if more than a predetermined number of errors are detected within the bin, etc.).

In accordance with the above, the mal-performance metric of the number of resynchs per unit time is modified to remove (generally speaking, at least some of) the resynchs caused by area wide events (e.g. such as thunderstorms), etc., thus providing a more useful metric for use in performing Dynamic Line Management. Thunderstorms are the most common area wide event which can cause many lines to simultaneously be forced into a resynch, however there are also other similar external events which can cause a line to re-synchronise even though the line is actually on an appropriate profile, and all such resynch events should therefore be disregarded. In embodiments, in a system where more performance metrics are used in determining whether or not a reprofiling should occur, any other metrics (such as detected errors occurring on a line) which are also identified as occurring on a line which it is estimated has been effected by an area wide event (e.g. a thunderstorm) during a period in which the area event is estimated to have been occurring, are disregarded.

In one embodiment, estimating the number of resynchronizations occurring as a result of an area wide event includes determining the proportion of live connections within a predetermined group of connections suffering a resynchronization within a test period of a predetermined duration and comparing this with a threshold and identifying all such resynchronizations as being caused by an area wide event if this proportion exceeds the threshold. Although this method of estimating the number of resynchronizations (or other parameters such as errors, etc.) resulting from an area wide event by comparing the proportion of lines experiencing a resynch (or other parameter/event such as errors) within a predetermined short period of time (e.g. within a five minute period of time) is currently believed to be the most practical way of estimating if an area wide event has occurred, it will nonetheless be apparent to persons skilled in the art that alternative methods could be used. Although such alternative methods may upon sufficient analysis operate in a very similar way in essence, it may nonetheless for certain approaches be difficult to establish that that is in fact the case. For example, if an Artificial Neural Network (ANN) were used, it could be trained based on input data about resynchronizations occurring on a large number of lines and be trained to output which of those resynchs are occurring as a result of an area wide event. Although it is likely that the underlying operation would be very similar to comparing proportions of lines experiencing resynchs/errors etc. with a threshold proportion within some period of time, it is notoriously difficult to ascertain the exact mathematical operation of ANN's and so this could be very difficult to ascertain for sure one way or another. Furthermore, if enough different types of data were fed into the ANN, it could well be that it finds some significant alternative underlying mathematical relationship which it can use to estimate resynchs (or errors, etc.) caused as a result of an area wide event.

A typical access network architecture to which the present invention is applicable includes a plurality of Digital Subscriber Line Access Multiplexors (DSLAM's) and/or Multi-Service Access Nodes (MSAN's) which (both) act as a point of convergence where a plurality of DSL lines are terminated and connected on via aggregated, higher bandwidth connections to the main network (e.g. to the Internet). Typically (though not necessarily or exclusively) the DSLAM's or MSAN's (or other aggregation transceiver device) are located at a local exchange (as they are called in the UK) or equivalent premises owned and controlled by a network operator. Each of these aggregation transceiver devices or aggregation points (e.g. a DSLAM or MSAN) aggregates a number of lines which are generally located within a reasonably small geographical area, although the actual size will vary, usually in dependence upon the average population density of the area, etc. In any event, it will often be the case that a large number of lines going to a single aggregation point will be located fairly close to one another from a geographical perspective. As such, an external event such as a thunderstorm can cause a number of lines aggregated at the same aggregation point to be affected at approximately the same time. Therefore, one implementation has a point of aggregation device such as a DSLAM or MSAN monitoring all of the terminated DSL connections and comparing the number of such connections which resynchronize within a certain duration of one another. In this implementation, the following parameters are configurable by an administrator of the point of aggregation device: the duration of the test period (within which any resynchronisations will be counted as possibly being caused by an area wide effect) and the threshold percentage of live lines experiencing a resynchronization which will trigger a detection of an assumed area wide event.

Different mechanisms can be used to control the start and finish times of a test period. For example, a series of non-overlapping windows of time equal to the test period duration could be used. Thus if the test period duration is set to ten minutes, then each time a period of ten minutes duration (e.g. from 1:00 pm to 1:10 pm, 1:10-1:20, etc.) expires the number of resynchronizations occurring in that period can be counted and compared against the threshold amount. This is a simple mechanism but can result in an event getting missed when it would otherwise count because the event occurs over a test period boundary (e.g. if half of the resynchs occurred just before 1:10 pm and half occurred just after it. This possibility can be mitigated by using overlapping test periods (e.g. from 1:00 to 1:10, from 1:05 to 1:15, from 1:10 to 1:20, etc.). Alternatively, though this is likely to be more computationally costly, a new test period could be started each time a resynchronization occurs.

Whatever method is used, if the threshold percentage of live lines resynchronizing within a given test period is exceeded, then all resynchronizations occurring within that test period (on lines connected to the associated aggregation point device can be disregarded in embodiments for purposes of deciding whether or not any of those resynchronizing lines should be moved to a different profile or not.

Note that the decision as to whether or not to move a particular line from one profile to another (hereinafter referred to as re-profiling a line) is made based on the number of resynchronizations made by the line in question during a "given period of time" which is different to the test period for ascertaining whether or not a collection of resynchronizations is likely to have been caused by an area event such as a thunderstorm. In particular, apart possibly from special procedures used to detect very unstable lines and correct those very quickly, the given period of time used to ascertain the best profile for a particular line to be moved to is typically of the order of about 24 hours, whereas the test period for looking for area events is-can be of the order of a few minutes or less in embodiments.

In an embodiment, each profile specifies at least two different parameters and, for example, the specified parameters are, or include, target signal to noise ratio margin and depth of interleave.

The method of disregarding area event caused resynchronizations can be used in conjunction with the teaching of co-pending application no. EP 07255001, incorporated herein by reference in its entirety, in which user caused resynchronizations (e.g. caused by a user switching off or disconnecting in someway his/her DSL modem (e.g. by unplugging the telephone line from the telephone line socket), etc. are also disregarded. In this case only automatic or forced resynchronizations which do not occur as a result of an area-wide event are considered for purposes of deciding whether or not to reprofile a line.

An automatic or forced resynchronization is one which occurs because errors on the connection cause a complete loss of connection. When this occurs, the end modems revert to an initial state in which a connection is re-established from scratch, rather than trying to rescue the previous connection. This is set out in the various xDSL standards including, in particular, ITU-T G992.1-ADSL1, ITU-T G992.3-ADSL2, ITU-T G992.5-ADSL2+ and ITU-T G994.1-Handshake Procedures for digital subscriber line (DSL) transceivers.

In one embodiment, determining or estimating the number of forced resynchronizations which do not occur as a result of an area-wide event comprises determining the total number of resynchronizations (in the given period of time of interest) for all reasons, estimating the total number of those resynchronizations caused by a user and the total number of resynchronizations accruing in that period as a result of an area wide event and subtracting these estimated numbers of user caused resynchronizations and area-wide event caused resynchronizations to obtain an estimate for the number of forced resynchronizations not caused by an area-wide event.

In one embodiment, estimating the number of user caused resynchronizations comprises detecting that more than a predetermined minimum period of time prior to or after a resynchronization has elapsed without a connection having been established and without the line automatically attempting, but failing, to re-establish the connection. Thus if the user simply switches off or unplugs the modem for a period of time greater than the minimum period of time, the resulting resynchronization is determined to be a user caused resynchronization rather than a forced resynchronization. In one embodiment, this is achieved by counting the contiguous periods of downtime exceeding the predetermined minimum period within the (longer) given period.

In one embodiment, a record is kept of each 15 minute period (bin) during which there is no connection in place, and the number of sets of contiguous periods in which no connection is recorded as being in place within any 24 hour period (batch) is taken as the estimated number of user caused resynchronizations within that 24 hour period; naturally, in alternative embodiments, different periods of time may be used for the bins or for the batches (e.g. 5 minute period bins and 48 hour batches, etc.). The number of contiguous periods (bins) can conveniently be determined by counting the number of transitions between periods (bins) in which no connections are recorded as being present and periods (bins) in which a connection is recorded as being present.

In one embodiment, two main parameters which control the operation of xDSL connections are varied to generate different profiles, the Signal-to-Noise Ratio (SNR) margin and the fast/interleave mode.

The SNR margin represents the amount of redundancy built into the selected bit rate (and other connection options) for the connection, given the measured value of the actual SNR experienced by the modem. Thus, each possible set of significant values for the connection parameters (i.e. bit-rate, level of trellis coding, level of interleave, etc.) has a corresponding baseline SNR which represents the minimum value of the SNR at which the connection would be expected to operate with a Bit Error Rate (BER) of $10^{-7}$ (i.e. 1 bit is expected to be in error for every $10^7$ bits); this BER of $10^{-7}$ is called the target rate as the connection is expected to operate very well with this level of BER. The SNR margin represents the amount (in decibels) by which the actual measured SNR exceeds this baseline amount at the time of setting up the connection. Thus the actual received SNR may vary over time, after setting up the connection, below the measured amount at setting up the connection by up to the amount of the margin and still the connection would be expected to operate with a BER of less than or equal to the target amount (i.e. at least as good as the target amount).

The definition of SNR margin which is given in the xDSL standard ITU G992.1 Section 9.5.1 is: "Signal-to-Noise Ratio (SNR) margin: The signal-to-noise ratio margin represents the amount of increased received noise (in dB) relative to the noise power that the system is designed to tolerate and still meet the target BER of 10-7, accounting for all coding (e.g. trellis coding, RS FEC) gains included in the design. The SNR margin ranges from −64.0 dB to +63.5 dB with 0.5 dB steps."

It will thus be appreciated, that the lower the SNR Margin, the higher the headline bit rate that will be achievable (i.e. assuming that there are no errors). Whilst, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this may change in the future. As is well known in the art, use of interleave protects against short duration noise spikes by interleaving units (e.g. bytes) of a certain number (depending on the depth of interleave) of code words (each comprising several units) where each code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to both be recovered if a noise caused two adjacent units within a two word transmission period to become corrupted). Interleaving provides protection against impulsive noises at the expense of increased latency (and greater buffering requirements of network equipment).

In another embodiment, there is provided an aggregation transceiver device for use in an access network including a plurality of data connections between end user devices and the aggregation transceiver device where the connections are aggregated for onward connection through the access network, the device comprising: a store storing a plurality of different profiles, each of which specifies a set of values for a set of one or more parameters associated with each data connection, and, for each data connection, a monitor operable to monitor the performance of the connection; a profile selector operable to select one of said stored profiles to be applied to the connection in dependence on the performance of the connection; and a profile applier operable to apply the selected profile to the data connection, wherein the monitor is further operable to determine the number of times that the connection resynchronises, within a given period of time, and to estimate the number of those resynchronizations occurring as a result of an area-wide event affecting a plurality of lines and wherein the profile selector is further operable to disregard any such resynchronizations when selecting a profile to apply to the data connection.

In another embodiment, there is provided a management device for use in an access network including a plurality of digital subscriber line protocol connections between end user devices and an aggregation transceiver device where the digital subscriber line protocol connections are terminated, the access network storing a plurality of different profiles each of which specifies a set of values for a set of one or more parameters associated with each data connection, the management device comprising: a receiver for receiving information from the aggregation transceiver device about the performance of the connections, a profile selector operable to select one of said stored profiles to be applied to each respective connection in dependence on the performance of the connection; and a transmitter operable to transmit information identifying the selected profile for each respective connection where the profile selector determines that a different profile should be selected for the respective connection, wherein the profile selector is operable to disregard any resynchronizations estimated to have occurred as a result of an area wide event when selecting a profile to be applied to a connection.

The estimation as to whether or not a resynchronization has occurred as a result of an area wide event can be performed either by the management device or by the aggregation transceiver device (e.g. the DSLAM or MSAN). An advantage of doing it at the management device arises when the management device manages more than one aggregation transceiver device which are located within a common geographical area (and serve end user devices located within a common geographical area which could be subjected to a common area wide event). For example, consider a case where a thunderstorm is active in an area which encompasses (and therefore affects) lines connected to two different but neighboring aggregation transceivers both of which are managed by the same management device. In such a case, the management device can take account of the data from both aggregation transceiver devices when making a decision as to whether or not a thunderstorm event has occurred and therefore whether or not a series of resynchronizations should be disregarded. An advantage of having the estimation performed by the aggregation transceiver device is that the processing required to perform this estimation can be distributed amongst the greater number of aggregation transceiver devices compared to the number of management devices where each management device on average manages more than one aggregation transceiver device.

In another embodiment, there is provided an aggregation transceiver device data collection device for use in an access network including a plurality of digital subscriber line protocol connections between end user devices and a plurality of aggregation transceiver devices where the digital subscriber line protocol connections are terminated, the data collection device comprising: a receiver for receiving information from a plurality of aggregation transceiver devices about the performance of the connections terminated at each such aggregation transceiver, an area event detector operable to process the received performance information to identify resynchronisations estimated to be caused as a result of an area wide event; and a transmitter operable to transmit aggregated performance information to a management device, the aggregated performance information being modified where appropriate to take account of any resynchronizations estimated to have occurred as a result of an area wide event.

The aggregated performance information is aggregated in the sense that it includes information about lines connected to a plurality of different aggregation transceiver devices. The aggregated information may be modified (when the information relates the performance of a set of connections during a period when at least some of those connections are estimated to have been affected by an area wide event) either by simply disregarding any such resynchronisations when reporting information about the number of resynchronizations suffered by each connection during a particular period of time being reported, or by including information identifying any such resynchronizations as being estimated to have been caused by an area wide event. Performing the detection of estimated area wide events within a data collector device, in an access network having a hierarchical arrangement in which there are more data collectors than management devices (of which there may be only one) but fewer data collectors than aggregation transceiver devices (e.g. DSLAM's and MSAN's) has some of the advantages of both of the second and third aspects of the present invention, namely the processing is somewhat distributed since there are many more data collector devices than management devices and yet each data collector may use information from more than one aggregation transceiver device to assist in correctly identifying area wide events affecting a set of lines distributed between two or more aggregation transceiver devices.

In another embodiment, there is provided an area wide event detector for use in an access network including a plurality of digital subscriber line protocol connections between end user devices and a plurality of aggregation transceiver devices where the digital subscriber line protocol connections are terminated, the device including means for identifying the occurrence of resynchronizations on a plurality of the connections and for ascertaining if more than a predetermined number (or proportion) of these occurs within a predetermined test period and if so, for identifying such resynchronizations as having been caused by an area wide event. An example method of ascertaining an appropriate threshold number above which to determine that it is likely that an area-wide event has occurred would be to take a resynchronization data for a predetermined grouping of lines (e.g. associated with a single aggregation device such as a DSLAM or associated with a single exchange or "local office" as they are termed in the US) over a period of time (e.g. a day or a week) determined by a human expert to be free of any area wide events (or alternatively excluding any such area wide events determined to have occurred during that period) and to calculate the average number of resynchs per (relatively short) unit of predetermined time (e.g. 5 or 15 minutes, etc) as well as some measure of the standard deviation from this mean, etc. A threshold may then be specified as being a certain number of standard deviations from the mean e.g. more than two standard deviations higher than the mean.

In one embodiment, all resynchronizations which occur within the test period and on lines perceived to be within a geographical area which is likely to have been affected by the area wide event are identified as resynchronizations estimated to have been caused by the area wide event. In some simple embodiments this is done by assuming that all resynchronizations happening on lines connected to the same aggregated transceiver device within the test period are caused by the area wide event. An enhancement of this would be to also identify any resynchronizations occurring during the same test period but on lines connected to other aggregation transceiver devices, if the other transceiver devices are deemed to be neighboring devices. In one embodiment, information about neighboring aggregation transceiver devices is prestored and derived based on knowledge about either the location of the aggregation transceiver devices (e.g. devices in the same local exchange are deemed to be neighboring devices) or based on the location of end user devices (e.g. if any two end user devices connected to different aggregated transceiver devices are known to be within a certain predetermined distance (e.g. 200 m) of one another, then the corresponding aggregation devices are deemed to be neighboring devices, etc.).

As noted above, an area wide detector according to embodiments can be advantageously incorporated into any one of an aggregation transceiver device, a data collector or a management device used within an access network, especially one using a digital subscriber line protocol within at least a part of the access network.

Further embodiments relate to systems, devices, computer programs and carrier means or media as set out in the accompanying claims, especially tangible carrier means such as optical storage devices (e.g. compact discs (CD's) or DVD's), or magnetic storage devices such as magnetic discs, or non-volatile solid-state memory devices.

BRIEF DESCRIPTION OF THE FIGURES

In order that the present invention may be better understood, embodiments thereof will now be described, by way of example only, with reference to the accompanying drawings in which.

DETAILED DESCRIPTION OF THE EMBODIMENTS

Figure 1:
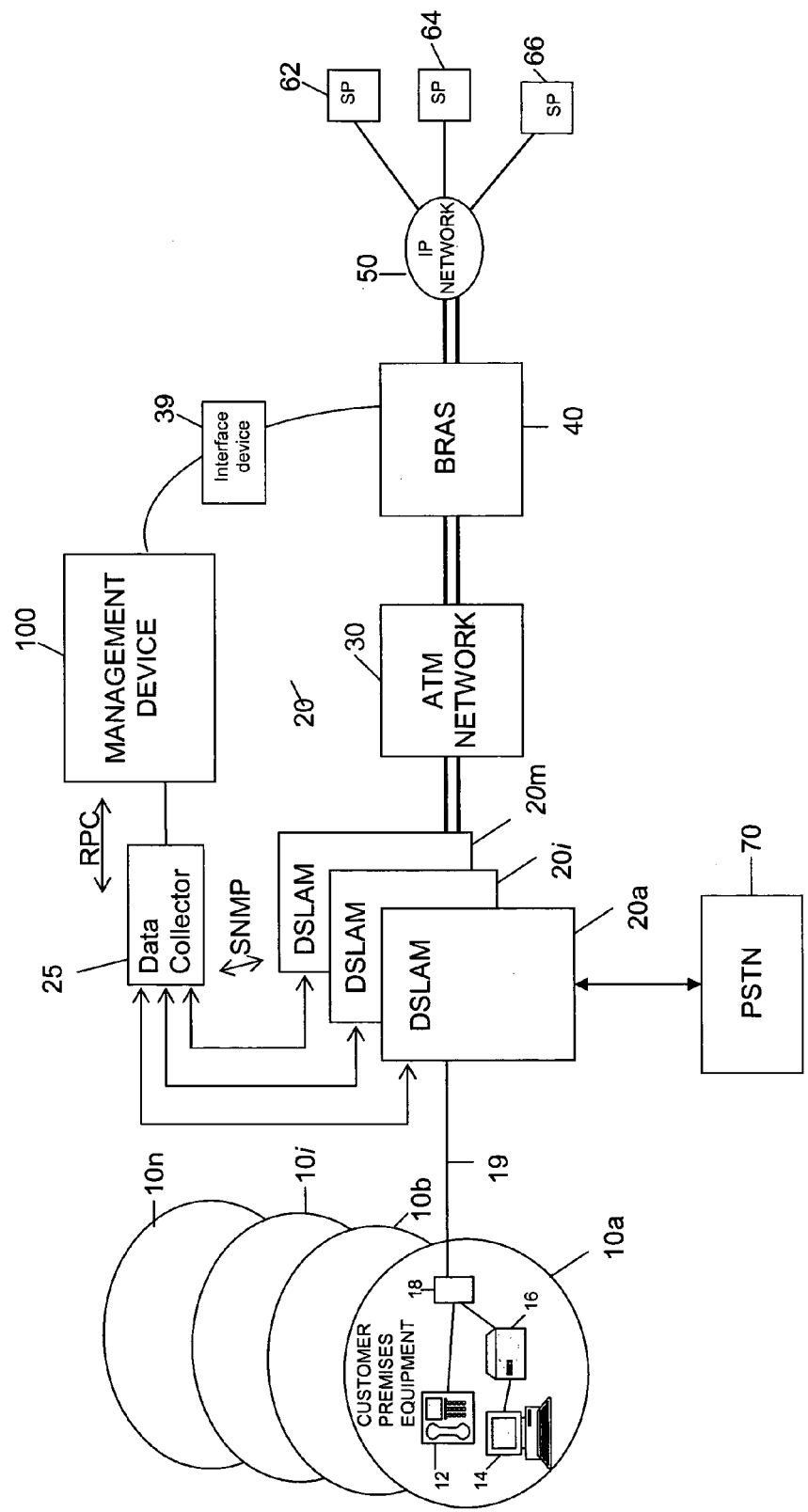
FIG. 1 is a schematic block diagram illustrating a telecommunications network operating in accordance with a method according to an embodiment.

One embodiment described below uses a management device 100 to perform two principal functions—Broadband Remote Access Server (BRAS) provisioning and Dynamic Line Management (DLM). The BRAS provisioning is described in brief in this application, for the sake of completeness, but it is described in greater detail in co-pending International patent applications GB2006/002826 and GB2006/002818 both filed on 28 Jul. 2006 and incorporated herein by reference in their entireties, referred to above, for readers interested in the particulars of the methods of BRAS provisioning applicable to the main embodiment.

As for the DLM function, this is a focus of embodiments discussed herein. In general, DLM is desirable in systems such as that of the aforementioned embodiment, where the downstream speed of the ADSL connections controlled by the management device rate adapt to the highest speed the line can support from 2 Mb to 8 Mb. In such cases, because the ADSL connections are running at their maximum limits they are more susceptible to noise which can cause errors and spontaneous resynchronizations (resyncs). Note this is just as applicable to other types of DSL connections such as SDSL VDSL, etc, as well as to all types of ADSL such as ADSL 2 and ADSL 2+.

In overview, the role of the DLM function of the management device is to ensure that the ADSL connections provide a good compromise between the stability of the line and the performance of the line in terms of bit rate (or perhaps more importantly the rate at which a user can receive desired data—after any lost packets caused by errors have been re-sent, for example) and latency. The DLM function does this (in one embodiment) by receiving data from DSLAM Data Collectors each day and processing this received data (note that in the present embodiment there is just a single management device 100, several data collectors (in this case DSLAM data collectors since the aggregation transceiver devices are DSLAMs) and lots of DSLAMs (the particular type of aggregation transceiver devices used in this embodiment). Note that each DSLAM data collector collects information from a plurality of DSLAM's. The DLM function (of the management device 100) is then able to increase or decrease the noise margins (i.e. the target SNR margins) and/or interleave levels as required by setting a new profile for each ADSL connection (using the existing provisioning systems for setting profiles at DSLAM's). This basic functionality is enhanced with logic to minimize churn or oscillation of profiles (by attempting to stabilize the DSLAM profile for each connection, rather than reacting to every relevant change in the environment of the connection which could cause the maximum stable profile applicable to change). In particular, in one embodiment, the function also seeks to avoid unnecessary downgrading of a user's profile from a more aggressive profile to a less aggressive profile as a result of any resynchronizations (or other normally negative performance parameters monitored by the DLM function such as detected errors, etc.) caused by an area wide event.

Referring to FIG. 1, a first embodiment is illustrated in overview. A copper pair loop 19 (which forms part of the access network which extends between customer premises equipment 10a, 10b, 10i, 10n and the BRAS 40) connects customer premises equipment 10a to a DSLAM 20a located within a local exchange (also known as a central office in the US). The DSLAMs 20a, 20i, 20m separate normal voice traffic and data traffic and send the voice traffic to the Public Switched Telephone Network (PSTN) 70. The data traffic is passed on through an Asynchronous Transfer Mode (ATM) network 30 which forms the remainder of the access network 19, 20, 30 (in one embodiment, the ATM network 30 is BRITISH TELECOM (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and dis-aggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet travelling from computer 14 towards an ISP 62, 64, 66 would be the BRAS 40; whereas in other cases the first hop from an IP perspective could be beyond the BRAS 40.

In all cases, the end user's modem 16 creates a Point-to-Point Protocol (PPP) session from the modem to another device in the network. This is a logical end to end connection that carries the end users traffic from the modem to the target IP network.

In some cases (e.g. in BT's Central+ product), the PPP session is terminated on the BRAS, and then onward routed directly onto the Internet (e.g. via a core IP network such as BT's Colossus network).

In one example configuration where the PPP session is not terminated at the BRAS 40, the PPP session is terminated on a "home gateway" at the edge of the core network, connected to the Service Provider (SP). In another example configuration (e.g. such as in the BT central product) a Layer 2 Tunneling Protocol (L2TP) tunnel is used to pass through the BRAS 40 to a terminating BRAS which belongs to the SP; the L2TP tunnel tunnels all the PPP sessions into the SP network for them to handle as they want.

In all cases, the first IP hop is from the end user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (where the BRAS 40 terminates a PPP connection from the customer premises equipment 10) or at a lower level (e.g. at the ATM layer) where there is some sort of sub-IP layer tunneling through the BRAS 40.

The above mentioned arrangement of items 10, 19, 20, 30, 40, 50, 62, 64, 66 and 70 is conventional. However, in addition to this conventional arrangement, in one embodiment there is a data collector 25 and a management device 100 which communicates with both the BRAS 40 and the DSLAM's 20 (via the data collector 25). The detailed operation of the management device (especially as regards its DLM function) is explained in greater detail below with reference to FIGS. 2 and 3. However, in overview it obtains information from the DSLAM 20 (via the DSLAM data collector 25) about the rate at which each Digital Subscriber Line (DSL) connects to the DSLAM and information about events such as detected errors and/or resyncs occurring on the line/connection and modifies the operation of the DSLAM's as regards the aggressiveness of the profile used by a respective DSLAM for a respective DSL connection. In one embodiment, the data collector collects the performance metric data from a plurality of DSLAMs and aggregates this together before sending it to the management device 100 either on a regular periodic basis or as a result of a request from the management device 100. Furthermore, in the present embodiment, any reprofiling instructions sent from the management device 100 and intended for a particular DSLAM also go via the data collector 25 (as part of the standard OSS mechanism—see below); however in other embodiments such reprofiling instructions could be sent directly to the DSLAM (or other aggregation transceiver device) in question or via some alternative mechanism.

In one embodiment the management device 100 communicates with each data collector 25 using the remote procedure call protocol whereas each data collector communicates with a connected DSLAM using the Simple Network Messaging Protocol (SNMP).

Figure 2:
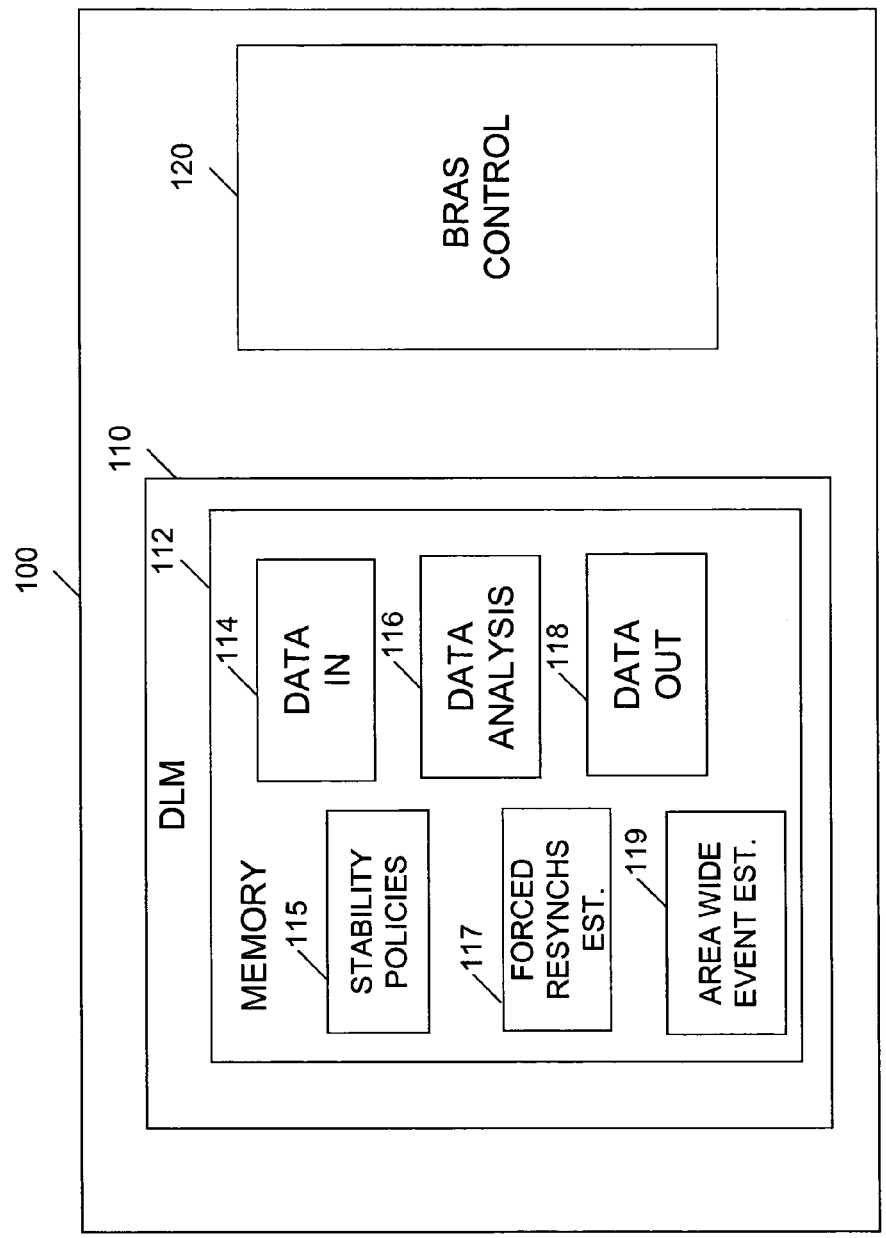
FIG. 2 is a schematic block diagram illustrating the management device of FIG. 1 in more detail.

As shown in FIG. 2, the management device 100 comprises two main functional parts, a BRAS provisioning or BRAS control function 120 and a Dynamic Line Management (DLM) function 110.

The BRAS provisioning function 120 processes part of the information received from the DSLAM's to assess a consistent connection speed achieved by each DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

Precise details of some of the algorithms which can be used by the BRAS Control function 120 of the management device 100 to calculate a consistent rate in the present embodiment are described in copending International applications GB2006/002826 and GB2006/002818, which are incorporated herein by reference in their entireties. However, it should be noted that the intention of these algorithms are to arrange that the user will receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM.

Details of the particular algorithm employed in the present embodiment by the DLM function are set out below. In overview however, a DLM data receiving sub-function receives a new file daily from each data collector 25 (also referred to as element managers) containing up to 96 timeslots (15 minute period) per DSL connection per day together with information about a stability policy or level associated with each connection. This data is used in a DLM analysis sub-function to determine if changes to the DSLAM profile are required to stabilize the end user's service to comply with the connection's respective associated stability policy or level. If changes are required, a DLM output sub-function sends a request to the Operational Support System (OSS) of the access network for the profile applied to the line to be changed. The precise way in which this is performed will depend on the details of the OSS of the particular access network and is not relevant to the present invention and so will not be described further herein.

Each of the DLM sub-functions mentioned above is implemented by standard computer processor components operating in accordance with software code modules stored in a memory 112 forming part of the DLM function 110; in particular, a DLM data receiving code module 114 (DATA IN) causes implementation of the DLM data receiving sub-function, a DLM analysis code module 116 (DATA ANALYSIS) causes implementation of the DLM analysis sub-function and a DLM output code module 118 (DATA OUT) causes implementation of the DLM output sub-function. Additionally, the memory 112 also stores the stability policy data set 115 (STABILITY POLICIES) in which the stability level or policy associated with each DSL connection managed by the management device is held. Furthermore, in the present embodiment, the memory 112 also stores a forced resynchronization estimation module 117 (FORCED RESYNCHS EST.) for implementing a sub-function to estimate the number of resynchronizations for each line in each batch of data caused as a result of some sort of error, etc. occurring in the connection rather than as a result of user actions (e.g. to switch off or disconnect their DSL modem). This forced resynchronization estimation sub-function is described in greater detail below. The memory 112 also stores an area wide event estimation module 119 for implementing an area wide event estimation sub-function in which certain of the resynchronizations reported to the DLM function are identified as having been caused by an area wide event and are therefore disregarded by the data analysis sub-function. This area wide event estimation sub-function is described in greater detail below.

The main source of input data for the DLM function is a daily file from each element manager, giving an aggregated report of each line's activity over the preceding 24 hours. This results in a change in DSLAM profile being applied no more frequently than once every 24 hours which is advantageous because it avoids the possibility of the DSLAM being reconfigured every time a line re-syncs. In addition however, the DLM function additionally receives input data specifying a stability level for each line. In one embodiment, this is input from a database into which the data is manually entered by an operator as part of the process of provisioning a new DSL connection and is stored within the stability policies data set 115 within the DLM memory 112. Thus in the present embodiment, the intention is that when a customer orders a DSL connection he/she is offered different levels of stability (which will be most suitable for certain different types of activity); thus customers who mostly intend to use the connection for video streaming will benefit from a stable connection, whereas customers mostly using their connection for downloading large files, etc. would benefit from a higher bit-rate rather than from very high stability levels. Alternatively, instead of providing this facility on an end-user by end-user basis, retail customers (i.e. Service Providers) of the network service operator (i.e. a wholesale network operator) could be provided with the option to select a stability level on behalf of their customers and could sell this on to their (end user) customers as a "specialized" product offering.

However, in alternative embodiments, the stability level could be updated more dynamically, as a result of a request by the user. In an example embodiment, a web server could be provided to receive user requests for a change of stability level (perhaps with a maximum permitted frequency of requests permitted per user, e.g. no more than one per hour or one per day, etc.) and this could then cause the DLM function as soon as possible to re-run it's comparison process for that line with the newly requested stability level and, if as a result of the comparison it is determined appropriate to transition to a new profile, then to transition to the new profile, again as soon as possible so that the user experiences a fairly dynamic response to a request to change the stability level.

Each time a line is checked to see if its profile should be changed (which in the present embodiment occurs once every 24 hours as part of a batch processing function), the corresponding stability level associated with that line is read and then threshold values for that line are set depending on the stability level associated with the respective line. The daily file data is then processed and the data for the respective line being analyzed is compared with the threshold values set for that line in dependence upon the stability level associated with the line. If the comparison indicates that a transition should be made, then a corresponding instruction is issued to the OSS system for a corresponding transition to be made.

The DSLAM profile has two parameters which are adjusted in the various different profiles available for the DLM function to choose between in order to improve the stability of the line or conversely to improve the bit-rate or low-latency of the connection: the target margin and the run mode (the latter enabling the use of interleaving). The default line profile which is initially applied to all lines has a target margin of 6 db and interleaving disabled (often referred to as being in fast mode). Changing these parameters is based on two performance metrics in one embodiment, errors (in particular, in this embodiment, errors caused by code-violations) and re-trains (i.e. re-syncs).

The number of errors and re-trains is normalized to up-time (total synchronized time during the period) and processed to disregard user caused retrains and area wide event caused errors and retrains in order to form the actual performance metrics used to determine the stability of the line. Normalization ensures that a given number of errors occurring in a short period of up-time is treated differently to the same number of errors occurring in a much longer period of uptime; for example 100 errors in 10 hours of up-time after normalization is (quite sensibly) very different from 100 errors in 1 minute of up-time. The normalization is performed by calculating a mean-time-between either errors or re-synchs. Furthermore, in one embodiment, the re-trains parameter is also processed, prior to use as a stability performance metric, by discounting the number of resynchs deemed to be user-caused resynchs, prior to calculating the mean-time-between resynchs. Similarly, the number of retrains and the number of errors are also processed prior to use as stability metrics, by discounting the number of errors and/or resyncs deemed to have been caused by an area wide event.

In one embodiment, the following method, as specified according to the following pseudo-code, is used to identify retrains believed to have been caused by a user event:

[Note the following assumes that an array uptimes[ ] has been formed and populated, such that each element in the array corresponds to one of the 96 15-minute bins per 24-hour period (in one embodiment) for a particular DSL connection—the type of the array (i.e. 1 bit numbers, 1 byte integers, short integers, floating numbers, etc.) is unimportant so long as where an element of the array is zero it indicates zero uptime in the corresponding bin and a non-zero value indicates that there was at least some uptime in that bin—if 1-bit values are used they may be considered as taking either a True or a False value, in which case one of these should be used to indicate zero uptime instead of zero—however, in one embodiment, each element comprises a short integer between 0 and 900 specifying the number of seconds of uptime in the respective 15-minute (i.e. 900-second) bin.]

*** Comment—method to count number of unforced retrains in a 24-hour period for a given connection

```
SET unforcedretrains = 0
FOR (i = 0 to 95) (
    IF (uptimes[i] = 0 AND uptimes[i+1] != 0) THEN unforcedretrains++
    )
RETURN unforcedretrains.
```

The above pseudo-code basically says to check each bin and determine if it has zero uptime whilst the subsequent bin has non-zero uptime (i.e. detecting a transition from a bin with no uptime to a bin with some uptime) and for each such transition to increment the variable unforced retrains which thus keeps a running total of the number of (assumed-to-be) user-caused re-synchs.

In one embodiment, the following method, as specified according to the following pseudo-code, is used to identify retrains and errors believed to have been caused by an are wide event:

[Note the following assumes that three two dimensional arrays uptimes[96,n], retrains[96,n] and errors[96,n] each having n by 96 locations from [0,0] to [95,n-1] formed and populated, such that each element in the array corresponds to one of the 96 15-minute bins per 24-hour period (in one embodiment) for each of the n DSL connections connected to a particular DSLAM—each element of each array contains a binary value taking either a zero or a one, each value in the uptimes array is set to zero to indicate zero uptime in the corresponding bin for the corresponding connection and a one to indicate that there was at least some uptime in that bin, each value in the retrains array is set to zero if there were no retrains in that bin and to one otherwise and each value in the errors array is set to zero if there were no errors in that bin and to one otherwise. There is also a formed but unpopulated one dimensional binary array called areaWideEvents[96] having 96 locations from 0 to 95 each of which takes a zero if no area wide event is deemed to be occurring in that timeslot and one otherwise.]

*** Comment—method to identify area event timeslots in a 24-hour period for a given DSLAM

```
FOR (i = 0 to 95) (
    integer upconnections = 0
    integer totalRetrains = 0
    integer totalErrors = 0
    FOR (j=0 to n) (
        IF (uptimes[I,j] = 1) THEN upconnections++
        IF (retrains[i.j] = 1) THEN totalRetrains++
        IF (errors[I,j] = 1) THEN totalErrors++
        )
    IF (100 * totalRetrains / upconnections >20) areaWideEvents[i] = 1
    ELSE IF ((100 * totalRetrains / upconnections >10) AND (100 *
        totalErrors / upconnections >50)) areaWideEvents[i] = 1
    ELSE areaWideEvents[i] = 0
    )
RETURN areaWideEvents[ ]
```

The above pseudocode basically says to go through all of the bins in each timeslot and add up the total number of connections in that timeslot having some uptime, the total number of those connections experiencing a retrain in that timeslot and the total number of the connections having some uptime experiencing an error in that timeslot and then to determine if for that timeslot the proportion of lines having some uptime which also suffer a retrain exceeds 20% or if the proportion of lines with some uptime experiencing a retrain exceeds 10% and the proportion of lines having some uptime experiencing errors exceeds 50% and for each such timeslot an area-wide event is recorded as having taken place in the area wide event array. Note that different values for the percentages can be used, or an area wide event could be identified based solely on errors regardless of how many retrains are detected, or absolute numbers could be used instead of proportional numbers, etc depending on the particular circumstances of the access network. In particular, the values used for the percentage thresholds in the above comparisons are generated based on an assessment of the mean and standard deviation values for these figures (e.g. the ratios of retrains per up-connections and errors per up-connections and combinations of these, etc.) in one embodiment. If using mean and standard deviation value analysis, it may be easier to perform a comparison firstly against ratio of retrains per up-connection and then separately simply against ratio of errors per upconnection independently of the ratio of retrains per upconnection.

Any retrains occurring in timeslots marked by the areaWideEvents array as occurring as a result of an area wide event are subtracted from the total number of retrains for each connection in that 24 hour period together with the detected number of unforced retrains for that connection to obtain an estimated number of forced retrains not caused by an area wide event for the 24-hour period and then the total uptime in seconds is divided by the estimated number of forced retrains not caused by an area wide event to obtain an estimated mean time between re-trains in seconds. In one embodiment, the uptimes[ ] array stores the number of seconds of uptime in each bin so that it is easy to obtain the total uptime for the connection by simply summing the values of all of the elements in the array. A mean time between errors is also calculated in a similar way after subtracting any errors identified as having been caused by an area wide event.

Having calculated the metrics to be used in assessing the stability of the line, a check is made against thresholds, etc. as described in greater detail below, and if it is deemed necessary or desirable a change in profile will be made.

In general, if a move to a less aggressive profile is deemed necessary, a move over to an interleaved profile is made in preference to an increase in the target margin. Initially an interleaved profile is set with the same corresponding target margin as the previous fast mode profile (i.e. 6 dB fast would transition to 6 dB interleaved).

If a customer has opted-out of the option to apply interleaving (e.g. because low latency is more important to them than maximum bit-rate—such as is often the case for customers who are on-line garners or VOIP or video conference users) then transitions are only made between fast mode profiles (only the target margin is varied). This clearly limits the capability of the DLM process.

Before a transition is made, a check is made against line rate to ensure that a line is capable of making the transition to a new profile without suffering a bit rate drop so drastic that it would fall below a predetermined minimum acceptable bit rate. A transition is only made if there is some confidence that the line will be capable of supporting service above this minimum acceptable rate once the new profile is applied. For example, in one embodiment a transition to a higher noise margin profile is only made if the current bit rate is approximately 800 kbps greater than a Fault Threshold Rate (FTR) (the FTR represents the minimum acceptable bit rate as determined by the network operator—in one embodiment, the network operator is a wholesaler of network services and supplies these services to network retailers, or Service Providers, who in turn supply consumers; the Maximum Stable Rate is a parameter which is determined by the wholesaler network operator and provided to the service provider as an indication of the estimated capability of the line, the FTR is related to the MSR but is set below this and is used to trigger a fault report if the connection rate ever falls below the FTR since this is an indication that the line is performing significantly below the rate that it is believed to be capable of operating at). If the line is unstable and yet cannot make the transition because it would drop below its minimum acceptable bit rate (i.e. the FTR), then this is flagged for further investigation. In one embodiment, the FTR is initially set at 2 Mbs and is then re-set to 80% of the Maximum Stable Rate detected by the network during the first 10 days of operation of the DSL in its rate adaptive mode.

If a line fails to synchronize then a transition will be made to a lower target margin. If this means returning to a previously unstable state then this is flagged for further investigation as the line is not effectively stabilized (even though it isn't at the maximum target margin). The line is returned to the previous unstable state so that some level of service can be provided to the customer whilst an investigation takes place.

If a line fails to synchronize even at the lowest target margin then it is flagged for investigation. For example, it may not be able to support the required service or the line may be faulty.

Similarly, if a line is still unstable at the maximum possible target margin then it is flagged for further investigation. For example the line may be faulty.

If a line is completely stable then in general the DLM function moves the line to a lower target margin (or interleave depth) to increase the available capacity (or reduce the latency) on the line (remember 3 dB≈800 kbps). However, these transitions are handled carefully to avoid frequent changes in target margin (or interleave depth) up and down. Thus if a line has previously been moved from a more aggressive lower target margin (or less interleaved) profile to the current target margin (and interleave depth), it must wait a considerably longer time (e.g. a week, or a month) before being re-transitioned back to the lower target margin (or interleave depth) profile than if it has not previously been moved back from the lower target margin (or interleave depth) profile.

In one embodiment, there is a manual process to enable the transition between any line profile (e.g. 3 dB fast straight to 15 dB interleaved is possible by manual intervention).

In one embodiment, those lines, which have been flagged for further investigation are pro-actively repaired in the hope that they can be repaired before any fault report is generated.

Re-profiling requests to move to a less aggressive profile can occur on a daily basis. Re-profiling decisions on stable lines to move to a more aggressive profile to increase overall capacity are made over a longer time period (which generally increases with the number of times that the line has previously been moved off the target profile because of lack of stability issues) as discussed in the preceding paragraph.

In one embodiment, each line is categorized by the first sub-function of the DLM function into one of four different categories in dependence upon the normalised number of errors and/or re-syncs as reported to the DLM function in the bulk file. The categories correspond to very poor, poor, acceptable and very stable.

The basic flow of the DLM process is shown in Table 1 below.

TABLE 1

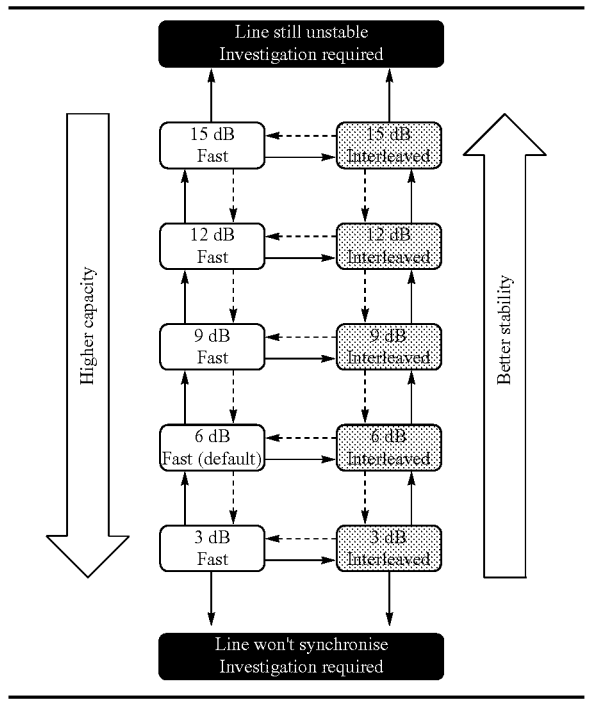

In one embodiment, the general progression through the profiles shown in Table 1 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorized as very poor is immediately moved two steps in the better stability direction (e.g. from 6 dB Fast profile it would move to 9 dB Interleaved, from 6 dB Interleaved it would move to 12 dB Interleaved, etc.). A line categorized as poor is immediately (although with lower priority than the re-profiling of any very poor categorized lines) moved one step in the better stability direction (e.g. from 6 dB Fast to 6 dB Interleaved or from 9 dB interleaved to 12 dB Interleaved). A line categorized as acceptable is maintained on its current profile (i.e. no action is taken). A line categorized as very stable is moved (if the further requirements to avoid oscillations etc. are also satisfied) one step in the higher capacity direction (e.g. from 6 dB Fast to 3 dB Fast, from 9 dB Interleaved to 6 dB Interleaved or from 3 dB Interleaved to 3 dB Fast).

In one embodiment, each line is processed once every 24 hours to determine how the line should be categorized, and thus if a new profile should be selected for that line. In order to avoid frequent oscillations between adjacent profiles, a good and a bad delay counter are used to place a delay on how quickly a line is reprofiled. Thus, every time a line is categorized as good a good delay counter is incremented (and a poor delay counter is decremented) and only once the good delay counter has reached a good threshold (which in the present embodiment is set to 13) is a request made to the OSS for the profile to be increased by one step to a more aggressive level, and then the delay counters are reset. Furthermore, every time a line is categorized as poor, a poor delay counter is incremented (and the good delay counter is decremented) and only once the poor delay counter reaches a poor threshold (which in one embodiment is set to 3) is its profile dropped by one step to a less aggressive level. The delay counters are never decremented below 0 such that even if a line has experienced a number of good days (such that the poor delay counter has been decremented to zero, e.g. five good days in a row) only 3 days in a row of the line behaving poorly are required for the poor threshold to be reached causing a re-profiling. Furthermore, a delay doubler is used to increase the delay (i.e. by increasing the good threshold) required before a line which has moved down from a more aggressive profile to a less aggressive profile level is allowed to re-transition back up to the more aggressive level. The delay doubler is therefore incremented (in one embodiment up to a maximum of 5) whenever the line is re-profiled to a less aggressive level and then the delays are reset (as in the case where the line is re-profiled to a more aggressive level). Resetting the delays is done according to the following formulas:

GOOD THRESHOLD=DEFAULT GOOD THRESHOLD*2EXP(DELAY DOUBLER)

POOR DELAY COUNTER=GOOD DELAY COUNTER=0

The DEFAULT GOOD THRESHOLD is set in the present embodiment to 13 (i.e. equivalent to 14 days), the DEFAULT POOR DELAY is set in one embodiment to 3 (i.e. equivalent to 3 days) and the DELAY DOUBLER is set to 0, thus the initial good delay is 13 but each time the line's profile is transitioned to a less aggressive profile the DELAY DOUBLER is incremented until after 5 such transitions, each time the DELAY is reset it is reset to a value of 448 (i.e. equivalent to approx 14 months). In one embodiment, if a user's stability policy or level is changed the delay doubler is reset back to zero; furthermore, the delay doubler and even the delay counter may be manually reset by an operator to cater for exceptional circumstances.

Figure 3:
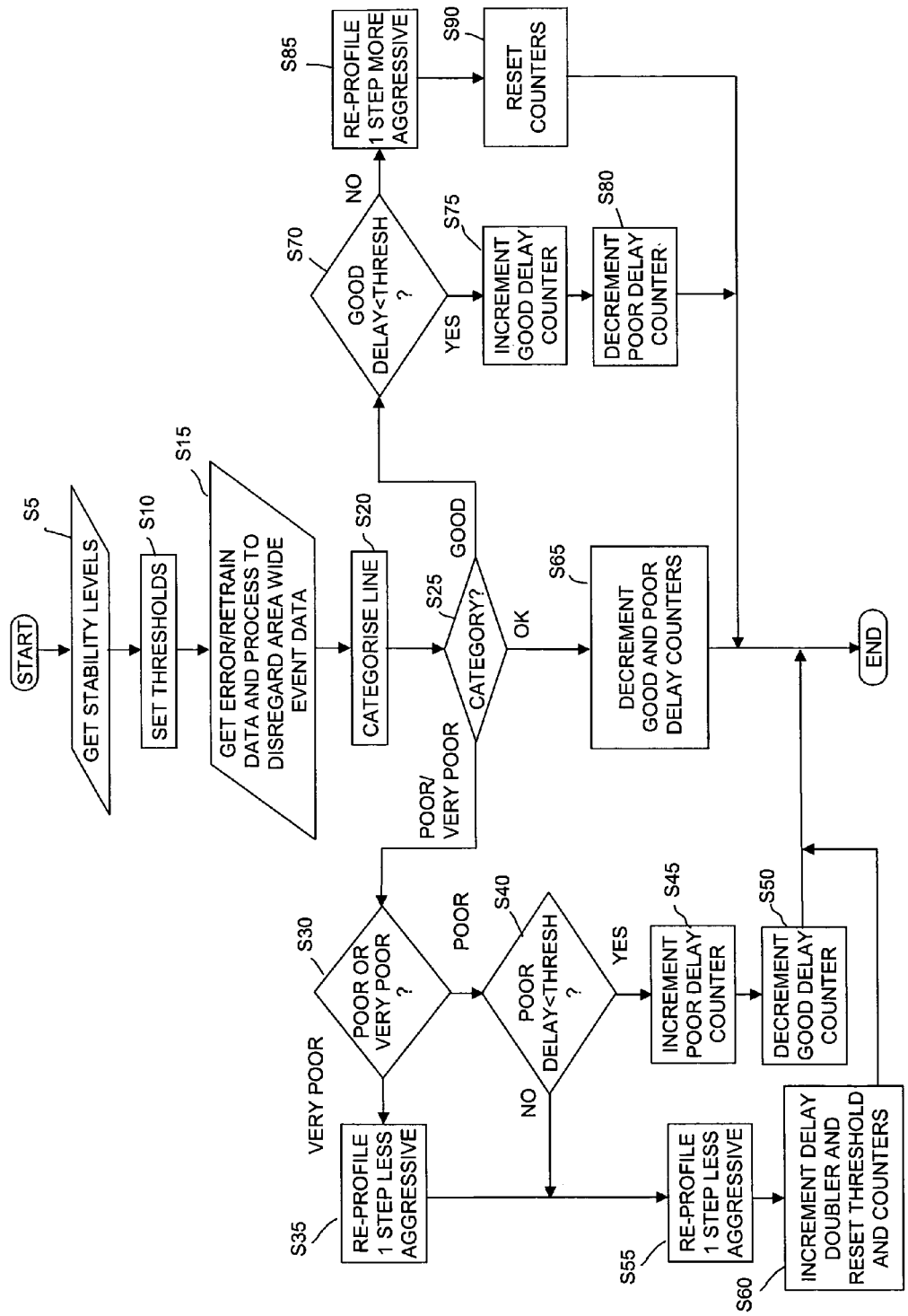
FIG. 3 is a flow diagram illustrating the steps carried out by the management device of FIG. 2 in order to control the DLM profile applied to the DSL connections in the network of FIG. 1.

In one embodiment, the specific functionality of the DLM function to permit different lines to operate at different levels of stability according to stability policies set for each line, is now described below with reference to FIG. 3. In brief, in one embodiment, before the DLM performs its line categorization function for a particular line, it's associated stability level is determined and then the categorization is based on the threshold values associated with the respective stability level, each stability level having a different set of associated threshold values for use in the categorization function. Thus, at step S5 the stability level for the particular line to be categorized is obtained together with the delay data stored for that line (i.e. the current value for the delay counter, DELAY, which, as mentioned above, is initially set to a value of 3 and the current value of the delay doubler, DELAY DOUBLER, which is initially set to a value of 0).

The process then moves to step S10 in which the threshold values associated with the stability level looked up in step S5 are obtained for use in the remainder of the process and then the process proceeds to step S15.

At step S15 the DLM function obtains the current error and re-synch data which it has received in respect of the present line being analyzed. This is read from the daily data file which is sent to the DLM function on a daily basis after processing as described above to take account of (i.e. to disregard) any errors and retrains caused either by user actions or as a result of an area wide event as described above. The process then proceeds to step S20.

Step S20 is the step responsible for actually categorizing lines into one of four possible different categories: very poor, poor, OK and good. To do this both of the metrics used in one embodiment, namely number of errors detected (at both the user modem and the network modem in the DSLAM) and the number of re-synchs (as recorded by the DSLAM) are compared (after normalization as mentioned above) with various corresponding thresholds whose values are set according to the stability level to which the line is assigned. Table 2 below sets out the various thresholds used in one embodiment.

TABLE 2

| Stability | Metric | Very Poor | Poor | OK | Good |
|---|---|---|---|---|---|
| Aggressive | Re-Trains | >10 per hour | mtb < 3600 | mtb < 8640 | mtb ≥ 8640 |
| Aggressive | Errors | — | mtb < 10 | mtb < 8640 | mtb ≥ 8640 |
| Normal | Re-Trains | >10 per hour | mtb < 7200 | mtb < 8640 | mtb ≥ 8640 |
| Normal | Errors | — | mtb < 300 | mtb < 8640 | mtb ≥ 8640 |
| Stable | Re-Trains | >10 per hour | mtb < 28800 | mtb < 86400 | mtb ≥ 86400 |
| Stable | Errors | — | mtb < 1000 | mtb < 28800 | mtb ≥ 28800 |

In table 2 "mtb" stands for "mean time between" and thus corresponds to the normalized metrics calculated by dividing the total time in seconds for which the respective line has been in synchronization over the past 24 hour period of the monitoring by the number of re-trains or errors recorded in that period. For all cases, in one embodiment, if there are more than 10 re-trains in any one hour period, the line is assumed to be very poor, regardless of the number of errors recorded. For lines operating at an aggressive stability level, if the average time between retrains is less than once per hour (=3600 seconds) (e.g. 6 re-trains in less than 5 hours of "up-time") or if the average time between errors is less than one per 10 seconds of up-time, then the line is deemed to be poor; if the average time between re-trains is less than once every 2.4 hours (but more than once every hour) or the average time between errors is less than once every 2.4 hours (but more than once every 10 seconds) then the line is deemed to be ok, whereas if the average time between re-trains is greater than or equal to once every 2.4 hours or if the average time between errors is greater than or equal to once every 2.4 hours, then the line is deemed to be good. From Table 2 above, it is clear what the thresholds are for the other stability levels in the same way.

In an alternative embodiment, the stability levels could operate such that for the most aggressive stability level the DLM function attempts to keep sync loses to below 12 per 24 hour period (including switching off modems/routers which count as a sync loss) and to keep the line error free for 98.3% (59/60 seconds) of uptime measured over a 24 hour period; for the normal stability level the DLM function attempts to keep sync loses to below 6 per 24 hour period and to keep the line error free for 99.8% (599/600 seconds) of uptime measured over a 24 hour period; and for the stable stability level the DLM function attempts to keep sync loses to below 3 per 24 hour period and to keep the line error free more than 99.98% (5999/6000 seconds) of uptime measured over a 24 hour period.

Having categorized the line according to Table 2 in step S20 the process proceeds to step S25 where it is determined if the line has been categorized as being "poor/very poor, OK, or good". If the line is categorized as being poor/very poor, the process proceeds to step S30 in which it is determined if the line has been categorized as very poor or poor. If at step S30 it is determined that the line has been categorized as very poor then the process proceeds to step S35 in which an OSS request is issued for the line DLM profile to be transitioned 2 steps in the less aggressive direction, provided it is at least two steps above the minimally aggressive level (which, in one embodiment is 15 dB, Interleaved as is clear form Table 1), otherwise it just transitions straight to this minimally aggressive level; if the line is already at this minimally aggressive level, it remains there but a fault is flagged to the system for attention by an engineer. Upon completion of step S35, the method proceeds to step S60.

If at step S30 it is determined that the line has been categorized as poor, the process proceeds to step S40 in which it is determined if the poor delay counter is less than the poor threshold. If so, the method proceeds to step S45 in which the poor delay counter is incremented (by one) and then the method proceeds to step S50 in which the good delay counter is decremented (by one). Upon completion of step S50, the process ends (for the respective line). If at step S40 it is determined, on the other hand, that the delay counter equals (or exceeds) the poor threshold, then the method proceeds to step S55 in which an OSS request is issued for the line DLM profile to be transitioned 1 step in the less aggressive direction, provided it is not already at the minimally aggressive level (which, in one embodiment is 15 dB, Interleaved, as is clear form Table 1), otherwise it remains there (i.e. at the minimally aggressive level) but a fault is flagged to the system for attention by an engineer. Upon completion of step S55, the method proceeds to step S60.

At step S60, which is arrived at either after performing a two step less aggressive reprofiling in step S35 or after performing a one step reprofiling in step S55, the delay doubler is incremented by one (provided it has not already reached its maximum value of 5 in which case it just stays at 5) and then the good threshold is reset according to the formula GOOD THRESHOLD=DEFAULT GOOD THRESHOLD*2EXP (DELAY DOUBLER). Finally in step S60, the poor and good delay counters are both reset to zero. Upon completion of step S60, the method ends (for the respective line being processed) and the DLM function moves on to analysing any further lines requiring analysis in the current 24 hour period batch process.

If at step S25 it is determined that the line is categorized as OK, then the process proceeds to step S65 in which the good and bad delay counters are both decremented by one (although if a counter is already at zero it is not decremented further but rather stays at zero). This decrementing of the delay counters for lines which are categorized as OK ensures that lines which are only occasionally good or only occasionally bad but mostly are OK, will remain on there current profile setting. Upon completion of step S65, the process (for the respective line being processed) ends.

If at step S25 it is determined that the line is "good", the method proceeds to step S70 in which it is determined if the good delay counter is less than the good threshold. If so, the process proceeds to step S75 in which the good delay counter for the line in question, (GOOD DELAY), is incremented (by one). Upon completion of step S75, the process proceeds to step S80 in which the poor delay counter (POOR DELAY) is decremented; this helps to prevent lines which are typically good as often as they are poor from being moved to a different profile. Upon completion of step S80, the process (for the respective line being processed) ends.

If at step S70 it is determined that the good delay counter (GOOD DELAY) is not less than the good threshold (GOOD THRESHOLD)—i.e. it has reached or exceeded the threshold—then the process proceeds to step S85 in which an OSS request is made to transition the DLM profile of the line one step in the more aggressive direction (provided it is not already at the most aggressive profile, which, in the present embodiment is 3 dB non-interleaved mode, as is clear from Table 1, in which case it simply stays at this most aggressive profile). Upon completion of step S85, the method proceeds to step S90 in which the delay counters, GOOD DELAY and POOR DELAY, for the line is reset and then the process (for the respective line) ends. As mentioned above, once the process ends for the current line being processed, the DLM function moves on to analysing any further lines requiring analysis in the current 24 hour period batch process.

As a slight variant on the above described process, an AGGRESSIVE PROFILE flag can be used to track when a reprofiling has been made in the more aggressive direction, and the delay doubler may be incremented only if a reprofiling has occurred in the less aggressive direction (immediately) after a reprofiling has been made in the more aggressive direction. This helps to increase the delay before which a more aggressive transition can be made only if there is evidence of oscillation between different profiles. This functionality can be implemented by including an additional step after (i.e. upon completion of) step S90 to set the AGGRESSIVE PROFILE flag to true (from a default setting of false); and by amending step S60 such that the delay doubler is only incremented if the AGGRESSIVE PROFILE flag is set to true, and then resetting the AGGRESSIVE PROFILE flag back to false after incrementing the delay doubler.

In alternative embodiments, different methods could be used to distinguish user-caused re-trains and forced re-trains. For example, some special software could be installed on the user modem end (i.e. either to run on the user's p.c. connected to the end-user DSL modem, or to run on the DSL modem itself) to detect whenever the modem is seemingly disconnected by the user (e.g. by detecting that power to the modem has been lost—e.g. because the user has switched off the modem or disconnected the power cable, etc; or by detecting that a telephone cable has been unplugged, etc.). Moreover, the various ADSL standards even specify as an optional requirement that the ATU's (i.e. the ADSL modems) should monitor for a loss of power and report this if requested. Unfortunately, this feature has not been widely implemented yet by manufacturers of ADSL modems. For this reason, the approach described in the embodiment above of looking for transitions between periods in which no connection is detected as being present and periods in which a connection is detected as being present is preferred in one embodiment because it can be done with common existing modems without any modifications to the modems or the users' pc's (or the software running thereon).

In alternative embodiments, the detection of area wide events could be performed by individual DSLAMs or by data collectors (or element managers). In such cases any errors or retrains identified as being caused by an area wide event could either simply not be reported to the management device (or to the data collector) or this information could be passed explicitly to the management device (or to the data collector) as this information could be useful in trying to identify other retrains or errors which could have been caused by an area wide event.

In the above embodiment, the bins are used as the test period for detecting area wide events; this is done largely for convenience and ease of processing. As an alternative different (possibly smaller) bins, and/or overlapping bins could be used specifically for the purpose of identifying area wide events (perhaps 5 minute overlapping bins could be used for area wide detection purposes while 15 minute bins are still used for other purposes—e.g. calculating mean times between errors and identifying user caused resyncs etc.) to further improve the detection of area wide events at the cost of increased processing and memory requirements.

In the above embodiment a simple comparison is made between the proportion of active lines experiencing a resynch within a certain predetermined period of time and some threshold above which it is determined that the resynchs are the result of an area wide event. In an alternative embodiment however, one or more Artificial Neural Networks (ANNs) could be used to perform the estimation. In such an embodiment, the neural network could take as inputs the three two dimensional arrays uptimes[96, n], retrains[96, n] and errors [96,n] each having n by 96 locations from [0,0] to [95,n-1] mentioned on page 20 above. However, this could be expanded to provide further inputs as would be appreciated by a person skilled in the art. The outputs in this simple case could represent the elements of the areaWideEvents array mentioned on page 21. The number of nodes within the hidden layer or layers could be varied until an acceptable arrangement is found as would be well understood by a person skilled in the art.

An example of additional inputs which could be provided to the ANN would be inputs for meteorological data. For example, a program could be written to determine from a weather-reporting web-site if there has been a thunderstorm reported within the vicinity of the cluster of lines being monitored and to correlate this with the periods to which each of the array value inputs relates. As an extreme but less preferred alternative such information could be relied upon exclusively instead of using the uptimes[96,], retrains[96, n] and errors [96,n] arrays (or equivalent information).

In order to train the ANN the first embodiment could be used to obtain some training data. In one embodiment the data generated in this way should be checked by a human engineer to try to remove any spurious examples and possibly also any borderline cases where the outcome is not clear to the engineer, etc. After cleaning the data in this way, the data can then be used to train the ANN and thereafter the ANN can be used to generate the areaWideEvents array which can then be used as in the main embodiment described above. An alternative training method would simply be to require that the input arrays are generated and studied by an engineer to ascertain what the appropriate output vectors should be and then to use these as the training data.

Where an estimator is provided at each aggregation device or at each exchange, a separate ANN could be built and trained for each such location, alternatively just one or a few ANN's could be built and trained and then replicated at every point where one is needed. In such a case the largest required ANN should be built and trained such that ANN's monitoring fewer lines can simply have some inputs disabled, etc. Alternatively the inputs could be processed to make the ANN more scalable to different numbers of lines being monitored, etc. by keeping the number of inputs to the ANN fixed regardless of the number of lines being monitored, etc.

The invention claimed is:

1. A method of operating an access network including a plurality of data connections between end user devices and an aggregation transceiver device where the connections are aggregated for onward connection through the access network, the method comprising:
storing a plurality of different profiles, each of which specifies a set of values for a set of one or more parameters associated with each data connection, and, for each data connection, monitoring performance of the connection;
selecting one of the stored profiles to be applied to the connection in dependence on a result of monitoring the connection; and
applying the selected profile to the data connection,
wherein monitoring the connection includes determining a number of mal-performance events occurring, within a given period of time, and estimating a number of those mal-performance events occurring as a result of an area-wide event affecting a plurality of lines and disregarding any such mal-performance events when selecting a profile to apply to the data connection, and wherein estimating the number of mal-performance events occurring as a result of an area wide event includes determining a proportion of live connections within a predetermined group of connections suffering a resynchronization within a test period of a predetermined duration and comparing the proportion with a threshold and identifying all such resynchronization as being caused by an area wide event if the proportion exceeds the threshold.

2. A method according to claim 1, further comprising identifying any errors occurring on connections within the predetermined group of connections experienced within a test period associated with an area wide event as being caused by an area wide event and therefore also disregarding such errors when selecting a profile to apply.

3. A method according to claim 1, in which selecting a profile is performed based on an estimation of a number of forced resynchronizations which do not occur as a result of an area-wide event, and wherein the estimation is performed by determining a total number of resynchronizations for all reasons, estimating a total number of those resynchronizations caused by a user and a total number of resynchronizations accruing in that period as a result of an area wide event and subtracting the estimated numbers of user caused resynchronizations and area-wide event caused resynchronizations to obtain an estimate for the number of forced resynchronizations not caused by an area-wide event.

4. An area wide event detector for use in an access network including a plurality of digital subscriber line protocol connections between end user devices and a plurality of aggregation transceiver devices where the digital subscriber line protocol connections are terminated, the detector comprising:
a module configured to store a plurality of different profiles, each of which specifies a set of values for a set of one or more parameters associated with each connection, and, for each connection, monitoring performance of the connection;
a module configured to select one of the stored profiles to be applied to the connection in dependence on a result of monitoring the connection;
a module configured to apply the selected profile to the data connection; and
a module configured to identify an occurrence of resynchronizations on a plurality of the connections and to ascertain if more than a predetermined number of the resynchronizations occurs within a predetermined test period and if so, to identify such resynchronizations as having been caused by an area wide event.

5. An area wide event detector according to claim 4, wherein the predetermined number comprises a proportion of a total number of live connections experiencing a resynchronization within the predetermined test period.

6. An aggregation transceiver device comprising:
an area wide event detector as claimed in claim 4.

7. A data collector comprising:
an area wide event detector as claimed in claim 4.

8. A management device comprising:
an area wide event detector as claimed in claim 4.

9. An access network comprising:
an aggregation transceiver device according to claim 6.

10. A machine-readable, non-transitory medium carrying a computer program or suite of computer programs for causing the method of claim 1 to be carried out during execution of the program or programs.

11. An access network comprising:
a data collector as claimed in claim 7.

12. An access network comprising:
a management device as claimed in claim 8.

* * * * *